United States Patent
Sood et al.

(10) Patent No.: US 10,164,873 B1
(45) Date of Patent: Dec. 25, 2018

(54) ALL-OR-NONE SWITCHOVER TO ADDRESS SPLIT-BRAIN PROBLEMS IN MULTI-CHASSIS LINK AGGREGATION GROUPS

(71) Applicant: Ciena Corporation, Hanover, MD (US)

(72) Inventors: Ankit Sood, San Jose, CA (US);
Hossein Baheri, Monte Sereno, CA (US); Leela Sankar Gudimetla, San Jose, CA (US); Vijay Mohan Chandra Mohan, San Jose, CA (US);
Wei-Chiuan Chen, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 92 days.

(21) Appl. No.: 15/611,283

(22) Filed: Jun. 1, 2017

(51) Int. Cl.
  *H04L 1/00* (2006.01)
  *H04L 12/709* (2013.01)
  *H04L 12/721* (2013.01)
  *H04L 12/24* (2006.01)

(52) U.S. Cl.
  CPC ........ *H04L 45/245* (2013.01); *H04L 41/0668* (2013.01); *H04L 45/66* (2013.01)

(58) Field of Classification Search
  CPC .... H04L 45/245; H04L 41/0668; H04L 45/66
  USPC ....................................... 370/219
  See application file for complete search history.

(56) References Cited

U.S. PATENT DOCUMENTS 8,817,594 B2 8/2014 Gero et al.
8,902,738 B2* 12/2014 Boggala .............. H04L 41/0663
  370/228
2012/0033665 A1* 2/2012 Jacob Da Silva .... H04L 45/245
  370/389
2013/0258839 A1 10/2013 Wang et al.
2016/0323179 A1* 11/2016 Wang ...................... H04L 45/28
2016/0352622 A1 12/2016 Gautam et al.
2017/0063672 A1 3/2017 Chhabra et al.

OTHER PUBLICATIONS

IEEE Computer Society, IEEE Standard for Local and metropolitan area networks, Link Aggregation, IEEE Std 802.1AX™, Nov. 3, 2008, New York, NY, pp. 1-163.
IEEE Computer Society, IEEE Standard for Ethernet, IEEE Std 802.3™, Dec. 28, 2012, New York, NY, pp. 1-634.

* cited by examiner

*Primary Examiner* — Sai Ming Chan
(74) *Attorney, Agent, or Firm* — Clements Bernard Walker PLLC; Christopher L. Bernard; Lawrence A. Baratta, Jr.

(57) ABSTRACT

Systems and methods utilize an all-or-none switchover to prevent split-brain problems in a Multi-Chassis Link Aggregation Group (MC-LAG) network. A standby node in the MC-LAG network can perform the steps of remaining in a standby state responsive to a loss of adjacency with an active node, wherein, in the standby state, all standby links between the standby node and a common endpoint are non-distributing; monitoring frames transmitted by the common endpoint to the standby node over the standby links; and determining based on the monitoring frames whether all active links between the active node and the common endpoint have failed and entering an active state with all the standby links distributing based thereon.

20 Claims, 8 Drawing Sheets

ALL-OR-NONE SWITCHOVER TO ADDRESS SPLIT-BRAIN PROBLEMS IN MULTI-CHASSIS LINK AGGREGATION GROUPS

FIELD OF THE DISCLOSURE

The present disclosure generally relates to networking systems and methods. More particularly, the present disclosure relates to systems and methods performing an all-or-none switchover to address split-brain problems in Multi-Chassis Link Aggregation Groups (MC-LAGs).

BACKGROUND OF THE DISCLOSURE

Link aggregation relates to combining various network connections in parallel to increase throughput, beyond what a single connection could sustain, and to provide redundancy between the links. Link aggregation including the Link Aggregation Control Protocol (LACP) for Ethernet is defined in IEEE 802.1AX, IEEE 802.1aq, IEEE 802.3ad, as well in various proprietary solutions. IEEE 802.1AX-2008 and IEEE 802.1AX-2014 are entitled Link Aggregation, the contents of which are incorporated by reference. IEEE 802.1aq-2012 is entitled Shortest Path Bridging, the contents of which are incorporated by reference. IEEE 802.3ad-2000 is entitled Link Aggregation, the contents of which are incorporated by reference. Multi-Chassis Link Aggregation Group (MC-LAG), is a type of LAG with constituent ports that terminate on separate chassis, primarily for the purpose of providing nodal redundancy in the event one of the chassis fails. The relevant standards for LAG do not mention MC-LAG, but do not preclude it. MC-LAG implementation varies by vendor.

LAG is a technique for inverse multiplexing over multiple Ethernet links, thereby increasing bandwidth and providing redundancy. IEEE 802.1AX-2008 states "Link Aggregation allows one or more links to be aggregated together to form a Link Aggregation Group, such that a MAC (Media Access Control) client can treat the Link Aggregation Group as if it were a single link." This layer 2 transparency is achieved by LAG using a single MAC address for all the device's ports in the LAG group. LAG can be configured as either static or dynamic. Dynamic LAG uses a peer-to-peer protocol for control, called Link Aggregation Control Protocol (LACP). This LACP protocol is also defined within the 802.1AX-2008 standard the entirety of which is incorporated herein by reference.

LAG can be implemented in multiple ways, namely LAG N and LAG N+N/M+N. LAG N is the load sharing mode of LAG and LAG N+N/M+N provides the redundancy. The LAG N protocol automatically distributes and load balances the traffic across the working links within a LAG, thus maximizing the use of the group if Ethernet links go down or come back up, providing improved resilience and throughput. For a different style of resilience between two nodes, a complete implementation of the LACP protocol supports separate worker/standby LAG subgroups. For LAG N+N, the work links as a group will failover to the standby links if any one or more or all of the links in the worker group fail. Note, LACP marks links as in standby mode using an "out of sync" flag.

Advantages of Link Aggregation include increased throughput/bandwidth (physical link capacity*number of physical links), load balancing across aggregated links and link-level redundancy (failure of a link does not result in a traffic drop; rather standby links can take over as active role for traffic distribution). One of the limitations of Link Aggregation is that it does not provide node-level redundancy. If one end of a LAG fails, it leads to a complete traffic drop as there is no other data path available for the data traffic to be switched to the other node. To solve this problem, "Multi-Chassis" Link Aggregation Group (MC-LAG) is introduced, that provides a node-level redundancy in addition to link-level redundancy and other merits provided by LAG.

MC-LAG allows two or more nodes (referred to herein as a Redundant Group (RG)) to share a common LAG endpoint (Dual Homing Device (DHD)). The multiple nodes present a single logical LAG to the remote end. Note that MC-LAG implementations are vendor-specific, but cooperating chassis remain externally compliant to the IEEE 802.1AX-2008 standard. Nodes in an MC-LAG cluster communicate to synchronize and negotiate automatic switchovers (failover). Some implementations may support administrator-initiated (manual) switchovers.

The multiple nodes in the redundant group maintain some form of adjacency with one another, such as the Inter-Chassis Communication Protocol (ICCP). Since the redundant group requires the adjacency to operate the MC-LAG, a loss in the adjacency (for any reason including a link fault, a nodal fault, etc.) results in a so-called split-brain problem where all peers in the redundant group attempt to take an active role considering corresponding peers as operationally down. This can lead to the introduction of loops in the MC-LAG network and result in the rapid duplication of packets.

Thus, there is a need for a solution to the split-brain which is solely implemented between the RG members that are interoperable with any vendor supporting standard LACP on the DHD and which does not increase switchover time.

BRIEF SUMMARY OF THE DISCLOSURE

There are some conventional solutions to addressing this problem. One conventional solution introduces configuration changes on the common LAG endpoint where the DHD detects the split-brain and configures packet flow accordingly. However, this solution is a proprietary solution requiring the DHD to participate in the MC-LAG. It would be advantageous to avoid configuration on the DHD due to the split-brain problem since the DHD may or may not be aware of the MC-LAG, preferably, the DHD may simply think it is participating in a conventional LAG supporting standard LACP. Another conventional solution includes changing the system MACs on RG members during a split-brain along with the use of an out-of-band management channel as a backup to verify communication between the RG members. However, this solution may lead to a significant switchover time since the underlying LACP would have to re-converge with the new system MACs.

In an embodiment, a method utilizing all-or-none switchover to prevent split-brain problems in a Multi-Chassis Link Aggregation Group (MC-LAG) network implemented by a standby node includes remaining in a standby state responsive to a loss of adjacency with an active node, wherein, in the standby state, all standby links between the standby node and a common endpoint are non-distributing; monitoring frames transmitted by the common endpoint to the standby node over the standby links; and determining based on the monitoring frames whether all active links between the active node and the common endpoint have failed and entering an active state with all the standby links distributing based thereon. The method can further include determining based on the monitoring frames whether less than all of the active links have failed and remaining in the standby state and continuing monitoring the frames transmitted by the common endpoint over the standby links based thereon. The monitoring can check for a presence of SYNC bits from the common endpoint with each SYNC bit set to TRUE indicative of a switch by the common endpoint of one of the active links to one of the standby links. The common endpoint can be communicatively coupled to both the active node and the standby node in an active/standby triangle topology. The common endpoint can be configured to operate Link Aggregation Control Protocol (LACP) and an N:N link-level redundancy between the active node and the standby node. The common endpoint can be unaware the active node and the standby node are in separate network elements. The loss of adjacency with the active node can be based on a failure or fault on a link between the active node and the standby node used for coordination of the active node and the standby node in a Redundant Group, while the active node and the standby node are both operational.

In another embodiment, a standby node in a Multi-Chassis Link Aggregation Group (MC-LAG) network configured with all-or-none switchover to prevent split-brain problems includes a plurality of ports in a logical Link Aggregation Group (LAG) with an active node, wherein the plurality of ports form standby links with a common endpoint; a communication link with an active node; and a switching fabric between the plurality of ports, wherein the standby node is configured to remain in a standby state responsive to a loss of the communication link, wherein, in the standby state, all the standby links are non-distributing; monitor frames transmitted by the common endpoint to the standby node over the standby links; and determine based on the monitored frames whether all active links between the active node and the common endpoint have failed and enter an active state with all the standby links distributing based thereon.

The standby node can be further configured to determine based on the monitoring frames whether less than all of the active links have failed and remain in the standby state and continue monitoring the frames transmitted by the common endpoint over the standby links based thereon. The frames can be monitored to check for a presence of SYNC bits from the common endpoint with each SYNC bit set to TRUE indicative of a switch by the common endpoint of one of the active links to one of the standby links. The common endpoint can be communicatively coupled to both the active node and the standby node in an active/standby triangle topology. The common endpoint can be configured to operate Link Aggregation Control Protocol (LACP) and an N:N link-level redundancy between the active node and the standby node. The common endpoint can be unaware the active node and the standby node are in separate network elements. The loss of adjacency with the active node can be based on a failure or fault on the communication link, while the active node and the standby node are both operational.

In a further embodiment, an apparatus configured for all-or-none switchover to prevent split-brain problems in a Multi-Chassis Link Aggregation Group (MC-LAG) network located at a standby node includes circuitry configured to remain in a standby state responsive to a loss of adjacency with an active node, wherein, in the standby state, all standby links between the standby node and a common endpoint are non-distributing; circuitry configured to monitor frames transmitted by the common endpoint to the standby node over the standby links; and circuitry configured to determine based on the monitored frames whether all active links between the active node and the common endpoint have failed and enter an active state with all the standby links distributing based thereon.

The apparatus can further include circuitry configured to determine based on the monitored frames whether less than all of the active links have failed and remain in the standby state and continue monitoring the frames transmitted by the common endpoint over the standby links based thereon. The circuitry configured to monitor can check for a presence of SYNC bits from the common endpoint with each SYNC bit set to TRUE indicative of a switch by the common endpoint of one of the active links to one of the standby links. The common endpoint can be communicatively coupled to both the active node and the standby node in an active/standby triangle topology. The common endpoint can be configured to operate Link Aggregation Control Protocol (LACP) and an N:N link-level redundancy between the active node and the standby node. The common endpoint can be unaware the active node and the standby node are in separate network elements.

BRIEF DESCRIPTION OF THE DRAWINGS

The proposed solution is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods performing an all-or-none switchover to address split-brain problems in Multi-Chassis Link Aggregation Groups (MC-LAGs). In particular, the systems and method solve the split-brain problem in an active/standby MC-LAG in a triangle topology (a DHD connected to a plurality of RG members). The proposed systems and methods are implemented between the RG members only without the involvement of the DHD; thus, the systems and methods can interoperate with any vendor's DHD. Also, the systems and methods do not change system MAC addresses thereby avoiding increased switchover time.

Active/Standby MC-LAG

Figure 1:
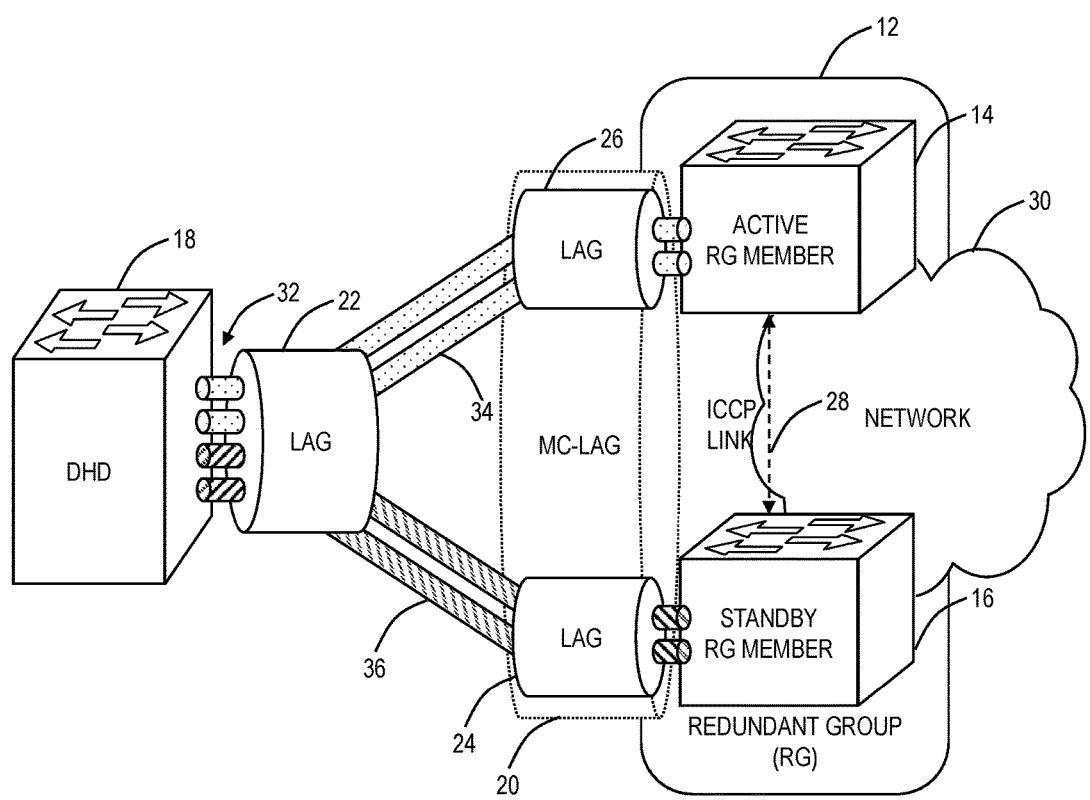
FIG. 1 illustrates an active/standby Multi-Chassis Link Aggregation Group (MC-LAG.

FIG. 1 illustrates an active/standby MC-LAG 10. MC-LAG 10 simply means dual-homing an endpoint to two or more upstream devices, i.e., allowing two or more upstream nodes to share a common endpoint thereby providing node-level redundancy. The MC-LAG 10 includes a Redundant Group (RG) 12 which includes RG member nodes 14, 16 which are the two or more upstream devices. The common endpoint is a Dual Homing Device (DHD) 18. The nodes 14, 16 and the DHD 18 can be Ethernet switches, routers, packet-optical devices, etc. supporting Layer 2 connectivity. The multiple nodes 14, 16 in the RG 12 present a single logical LAG interface 20 which is an MC-LAG to a DHD LAG 22. Specifically, the nodes 14, 16 each have a separate LAG 24, 26 which are logically operated as the logical LAG interface 20 based on adjacency and coordination between the nodes 14, 16. In this manner, the RG 12 can appear to the DHD 18 as a single node with the logical LAG interface 20.

In order to present the RG 12 as the logical LAG interface 20, the nodes 14, 16 rely on LACP as an underlying communication protocol between one another. The nodes 14, 16 can exchange their configuration and dynamic state data over an Inter-Chassis Communication Protocol (ICCP) link 28. Again, the nodes 14, 16 are different physical network elements which can be in the same location or in different locations. In either situation, the nodes 14, 16 are interconnected via a network 30, such as a G.8032 Ethernet network, a Multiprotocol Label Switching (MPLS) network, or the like. The ICCP link 28 can be a physical connection in the network 30. Also, the ICCP link 28 can be a dedicated link between the nodes 14, 16 such as when they are in the same location or chassis.

RG 12 implementation is typically vendor-specific, i.e., not specified by the relevant LAG standards. However, in general, the objective of the RG 12 is to present the nodes 14, 16 and the logical LAG interface 20 as a single virtual endpoint to a standards-based LAG DHD 18. Various vendors use different terminology for the MC-LAG which include: MLAG, distributed split multi-link trunking, multi-chassis trunking, MLAG, etc. The proposed systems and methods described herein can apply to any implementation of the RG 12 and seek to avoid coordination with the DHD 18 such that the RG 12 appears to any LAG-compliant DHD 12 as the single logical LAG interface 20. Also, other terminology may be used for the ICCP link 28, but the objective is the same—to enable adjacency and coordination between the nodes 14, 16.

The ICCP link 28 can be monitored via keep-alive message exchanges that deem this link operational. For faster ICCP Link Failure detection/recovery, Connectivity Fault Management (CFM) or Bidirectional Forwarding Detection (BFD) services can be configured across the RG member nodes 14, 16.

In the example of FIG. 1, the DHD 18 includes four ports 32 into the LAG 22, two ports 34 are active and connected to the LAG 26 and two ports 36 that are standby connected to the LAG 24. In this manner, the MC-LAG 10 is an active/standby MC-LAG. From the perspective of the DHD 18, the four ports 32 appear as a standard LAG, and the DHD 18 is unaware that the ports 34, 36 terminate on separate nodes 14, 16. The ICCP link 28 coordination between the RG member nodes 14, 16 cause them to appear as a single node from the DHD 18's perspective.

Figure 2:
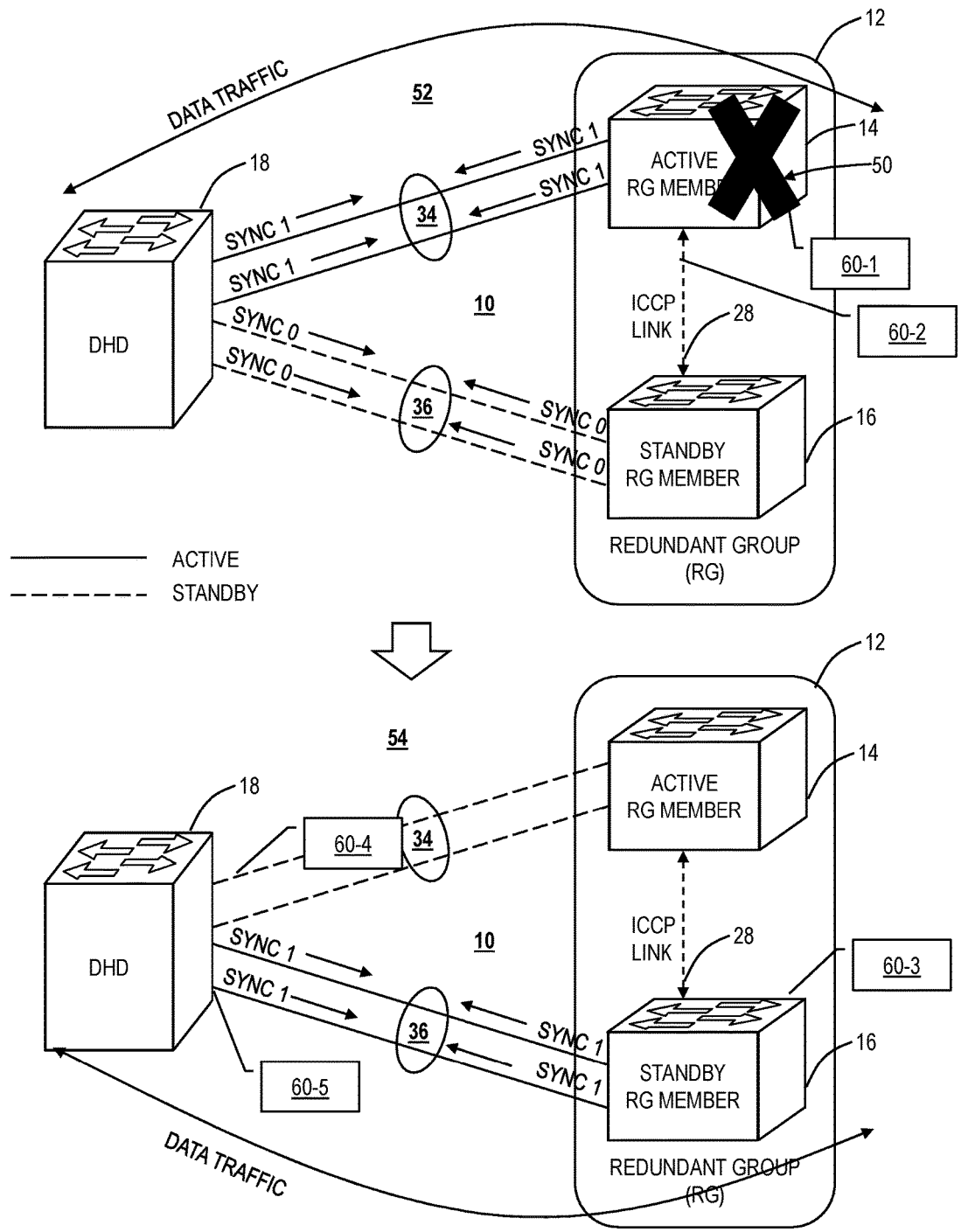
FIG. 2 illustrates the MC-LAG of FIG. 1 with a fault and associated node-level redundancy.

FIG. 2 illustrates the MC-LAG 10 with a fault 50 and associated node-level redundancy. Specifically, FIG. 2 illustrates two states 52, 54 shown to illustrate how node-level redundancy is performed. At the state 52, the ports 34 are active such that the node 14 is the active RG member node and the ports 36 are standby such that the node 16 is the standby RG member node. In LACP, the ports 34, 36 include sending frames (LACPDUs—LACP Protocol Data Units) between the DHD 18 and the nodes 14, 16 with SYNC bits. Prior to the fault 50, the ports 34 have the LACPDU SYNC bits set to 1 indicating the ports 34 are active and the ports 36 have the LACPDU SYNC bits set to 0 indicating the ports 36 are standby.

At step 60-1, assume the node 14 fails, and the active RG member node's failure causes protection switching of traffic to the standby RG member node 16. As soon as the standby RG member node 16 losses connectivity with active RG member node 14 (the ICCP link 28 failure in step 60-2 due to the fault 50), the standby RG member node 16 takes the active role by setting the SYNC bit=1 on all its member ports 36 at step 60-3. Since the DHD 18 also gets a link failure for all active links on the ports 34 at step 60-4, all the standby links on the DHD 18 take the active role by setting their SYNC bit=1 at step 60-5. This makes the backup links "distributing" and hence, traffic switches to the new active RG member node 16 (node-level redundancy).

Split-Brain in Active/Standby MC-LAG Triangle Topology

An MC-LAG supports a triangle, square, and mesh topology. Particularly, the disclosure herein focuses on the split-brain problem and solution in the MC-LAG triangle topology such that the DHD 18 is not required to participate in the diagnosis or correction and such that the ports 34, 36 do not require new MAC addresses.

The split-brain problem is an industry-wide known problem that happens in the case of dual homing. It may occur when communication between two MC-LAG nodes 14, 16 is lost (i.e., the ICCP link 28 failed/operational down) while both the nodes 14, 16 are still up and operational. When the split-brain problem happens, both the nodes 14, 16, being no longer aware of each other's existence, try to take active role considering the other one as operationally down. This can lead to the introduction of loops in MC-LAG 10 network and can result in rapid duplication of packets at the DHD 18.

The ICCP link 28 communication can be lost between the nodes 14, 16 for various reasons, such as misconfigurations, network congestion, network errors, hardware failures, etc. For misconfigurations, example problems can include configuring or administratively enabling the ICCP link 28 only on one RG member node 14, 16, configuring different ICCP heartbeat interval or timeout multiplier on the RG member nodes 14, 16, incorrectly configuring CFM or BFD Monitoring over the ICCP link 28, configuring CFM Maintenance End Points (MEPs) incorrectly that may result in MEP Faults (MEP Faults will be propagated to the ICCP link 28 deeming the ICCP link 28 operationally down), etc. Network congestion may lead to CFM/BFD/ICCP frame-loss that in-turn may cause the ICCP link 28 to appear operationally down while some data traffic may still be switched across. For network errors, high bit errors may result in CFM/BFD/ICCP packet drops. For hardware failure, Operations, Administration, and Maintenance (OAM) engine failures may result in faults in the ICCP link 28 monitoring. For example, the OAM engine may be implemented in hardware as a Field Programmable Gate Array (FPGA), a Network Processor Unit (NPU), an Application Specific Integrated Circuit (ASIC), etc.

Figure 3:
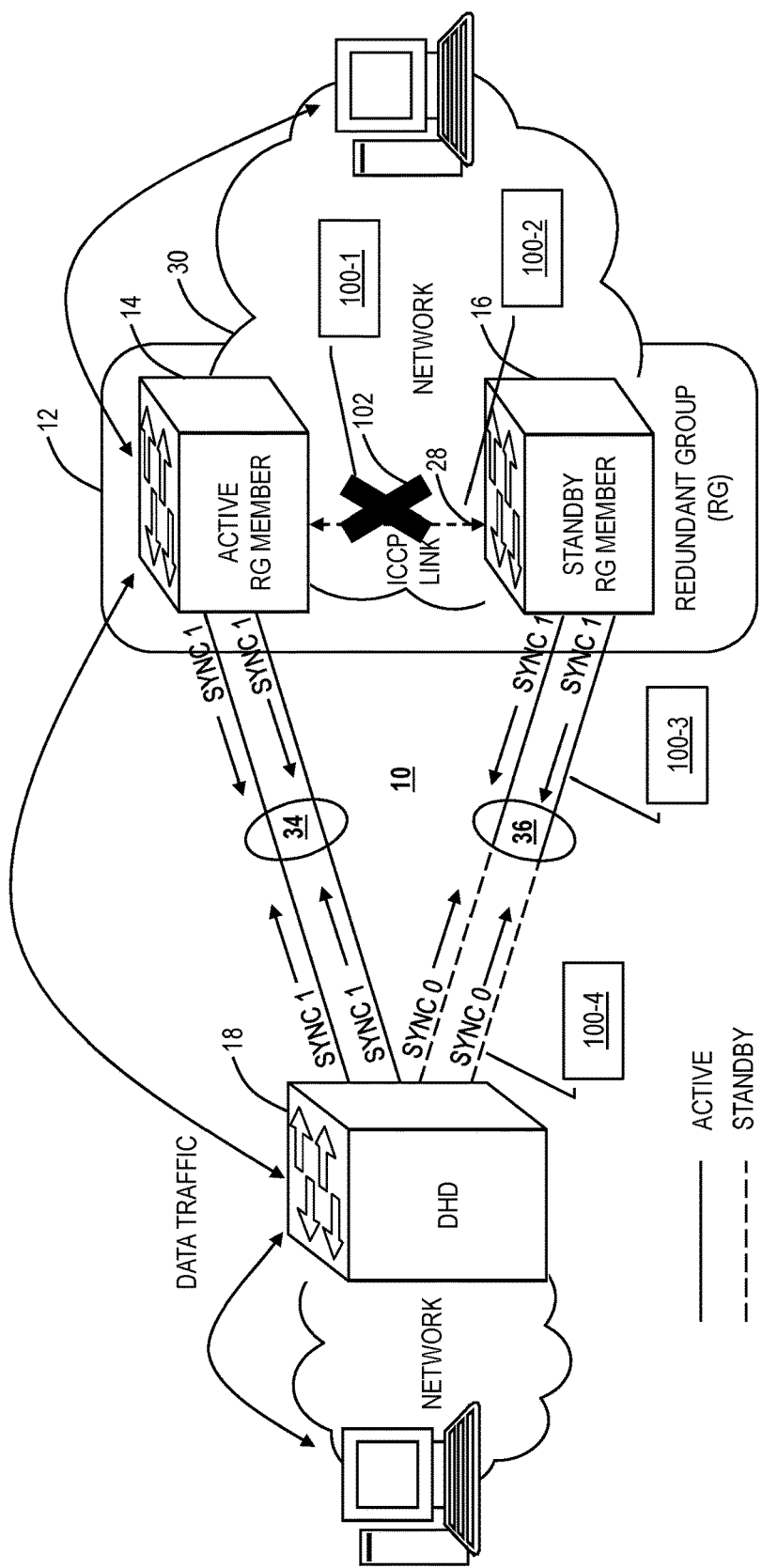
FIG. 3 illustrates the MC-LAG of FIG. 1 with the Inter-Chassis Communication Protocol (ICCP) link failed and associated operation with no other faults.

FIG. 3 illustrates the MC-LAG 10 with the ICCP link 28 failed and associated operation with no other faults. At step 100-1, there is a fault 102 that causes the ICCP link 28 to fail. The reason for fault 102 is irrelevant. At step 100-2, since the ICCP link 28 connectivity is lost between the RG member nodes 14, 16, both the RG member nodes 14, 16 try to take the active role by setting the SYNC bit to 1 on all their member ports 34, 36. The node 14 already is the active node, so the node 14 does not change the SYNC bit, but the node 16 is in standby and goes into standalone active at step 100-3.

This scenario, however, does not cause the split-brain problem to occur because of the configured link-level redundancy (N:N) on the DHD 18. Since all N links on the ports 34 from the active RG member node 14 are active, the DHD 18 does not set its SYNC bit on the N standby links on the ports 36 at step 100-4. This prevents the standby path from going to the distribution state even though standby RG member node 16 (after taking the new active role) sets the SYNC Bit to 1 on the backup path.

Figure 4:
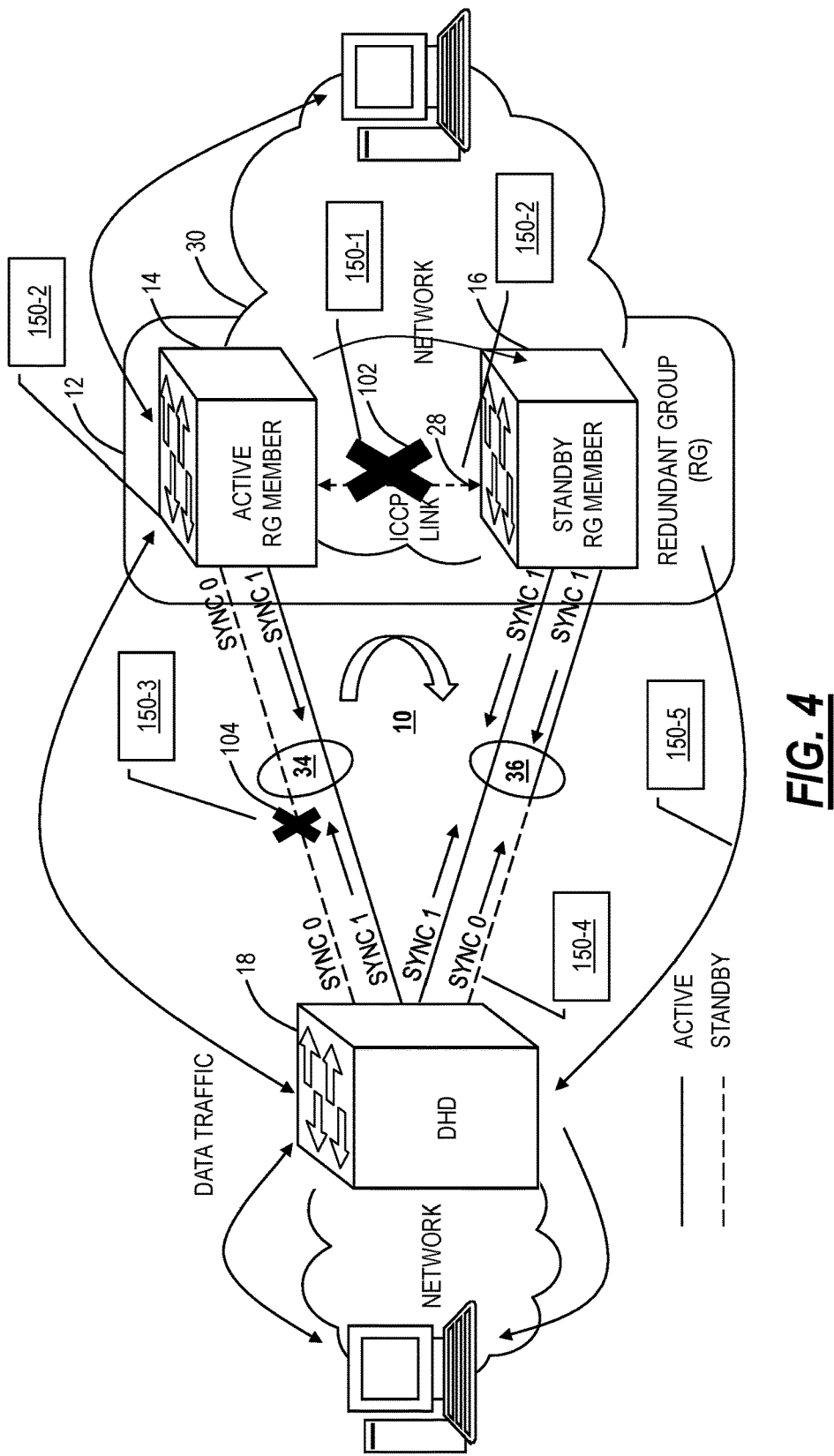
FIG. 4 illustrates the MC-LAG of FIG. 1 with the ICCP link failed and associated operation with a fault on one of the active links causing the split-brain problem of the prior art.

FIG. 4 illustrates the MC-LAG 10 with the ICCP link 28 failed and associated operation with a fault 104 on one of the active links (34) causing the split-brain problem. At step 150-1, there is fault 102 that causes the ICCP link 28 to fail. Again, the fault 102 could be for any reason. At step 150-2, since the ICCP link 28 connectivity is lost between the RG member nodes 14, 16, both the RG member nodes 14, 16 try to take the active role by setting the SYNC bit to 1 on all their member ports 34, 36.

An issue, however, arises if any distributing link fails on the ports 34 between the DHD 18 and the active RG member node 14. At step 150-3, the fault 104 causes a failure on one of the ports 34, and the SYNC bit is 0 and unable to send on this port. In this scenario, the DHD 18, unaware of the fault 102 affecting the ICCP link 28, selects one of the standby links on the ports 36 to take an active role and sets its SYNC Bit to 1 at step 150-4.

The SYNC bit has already been set to 1 on the standby RG member node 16 because of the ICCP link 28 fault 102. Thus, the backup path on the ports 36 goes to the distribution state. Since, there is at least one link distributing from the DHD 18 to both the RG member nodes 14, 16; it results in the formation of a loop resulting in packet duplication towards the DHD at step 150-5. The result is the split-brain problem where the member nodes 14, 16 cause the loop due to their lack of adjacency and coordination. The split-brain problem can only occur when there are more than one physical ports between the DHD 18 and each RG member node 14, 16. In case there is only one physical port between the DHD 18 and each RG member node 14, 16, the DHD's 18 1:1 redundancy will ensure that only one port can be active at any point of time thus preventing active-active situation from happening. However, N:N/M:N redundancy is desired over 1:1 redundancy and employing N:N/M:N redundancy exposes the arrangement to the split-brain problem.

Figure 5:
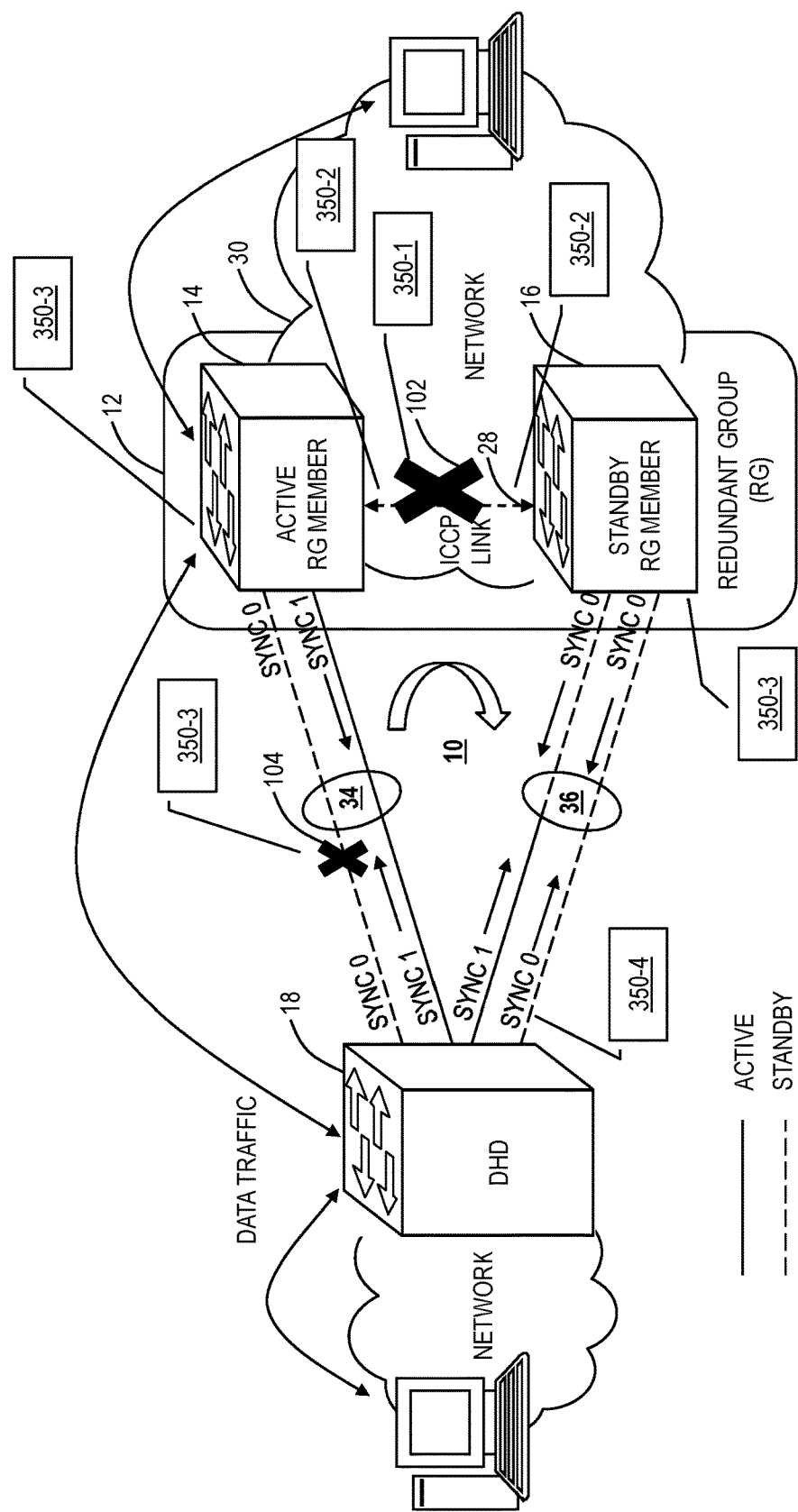
FIG. 5 illustrates the MC-LAG of FIG. 1 with the ICCP link failed and associated operation with a fault on any but the last the active link in an all-or-none (AON) switchover to prevent the split-brain problem in accordance with an embodiment of the proposed solution.
Figure 6:
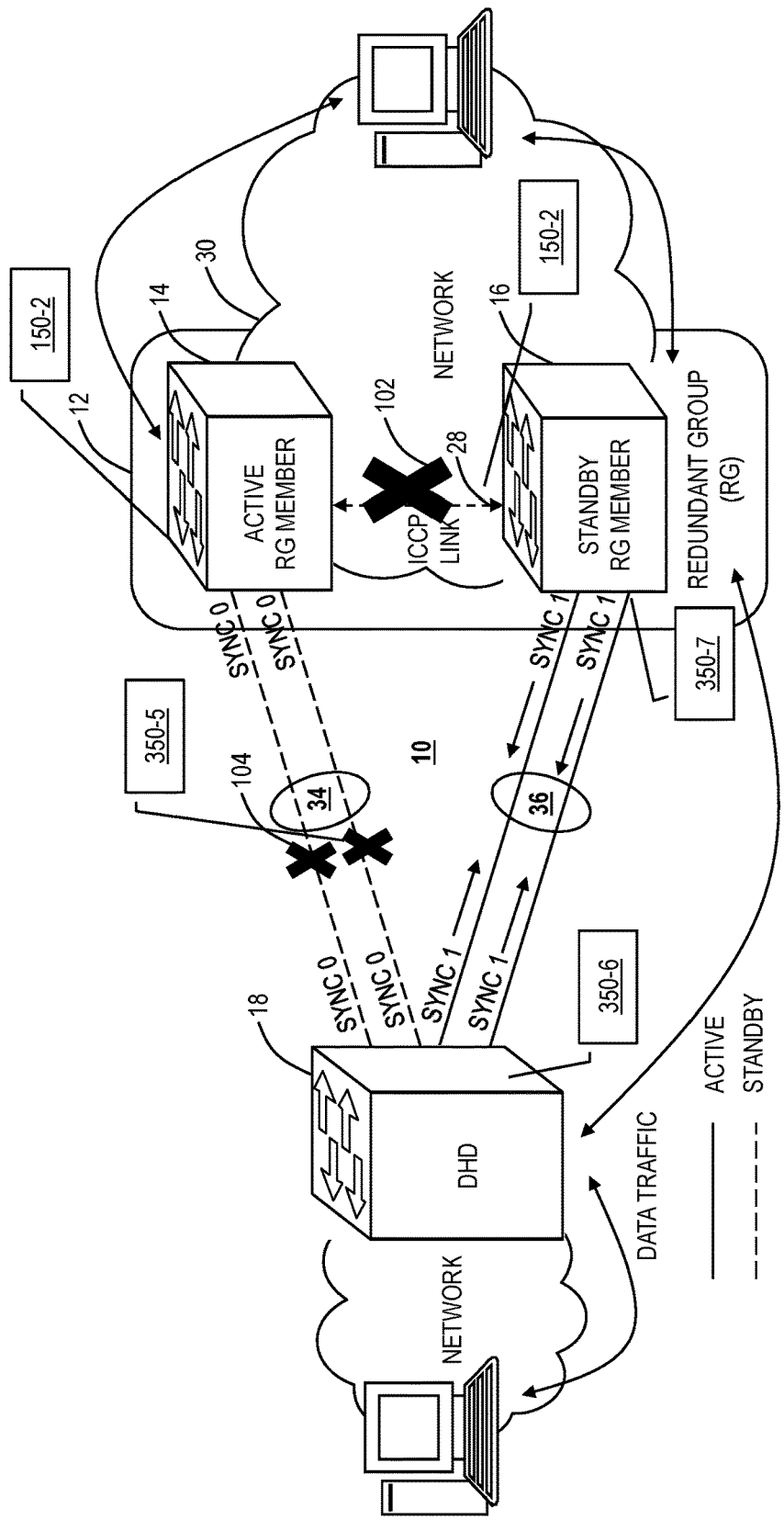
FIG. 6 illustrates the MC-LAG of FIG. 1 with the ICCP link failed and associated operation with a fault on all of the active links in the AON switchover in accordance with an embodiment of the proposed solution.

All-or-None Switchover in Split-Brain in Active/Standby MC-LAG Triangle Topology FIGS. 5 and 6 illustrate the MC-LAG 10 with the ICCP link 28 failed and associated operation with a fault 104 on one of the active links with an all-or-none (AON) switchover to prevent the split-brain problem in accordance with the proposed solution. Specifically, FIG. 5 illustrates the MC-LAG 10 with the ICCP link 28 failed and associated operation with a fault 104 on any but the last the active link (34) in the AON switchover. FIG. 6 illustrates the MC-LAG 10 with the ICCP link 28 failed and associated operation with fault 104 on all of the active links in the AON switchover.

The AON switchover can be implemented by each of the RG member nodes 14, 16 with the restriction that the standby RG member node 16 will only take the active role when all of the active links (34) on the active RG member node 14 fail. Of course, the RG member nodes 14, 16 cannot coordinate this with one another due to the fault 102 and the lack of adjacency. Instead, this is achieved by making optimal use of the SYNC bit as employed by DHD 18. When the ICCP link 28 goes down operationally, the standby RG member node 16 will not set its member's SYNC bit to 1 immediately, but rather rely on the DHD 18 port's SYNC bits in order to set its member's (16) SYNC bit. The standby RG member node 16 will set its port's SYNC Bits to 1 only if receives SYNC bit=1 on all the operational ports from the DHD 18.

The AON switchover eliminates a loop during split brain situation where MC-LAG 10 is configured with N:N link redundancy and there is no link failure on the standby path (on the ports 36). With the AON switchover, when the ICCP link 28 fails, the standby RG member node 16 will not go active and will keep the SYNC Bits to FALSE (0) and will keep monitoring the SYNC bits coming from the DHD 18. Again, the DHD 18 may not know it is in the MC-LAG but rather assume this is a standard LAG. This AON switchover approach does not require the DHD 18 to have a special configuration, but rather operate standard LACP. Further, the AON switchover does not require new MAC addresses and/or re-convergence.

If RG member nodes 14, 16 are runtime upgraded to employ the functionality of the proposed solution, preferably standby RG member node 16 should be upgraded first (before active RG member node 14).

Figure 7:
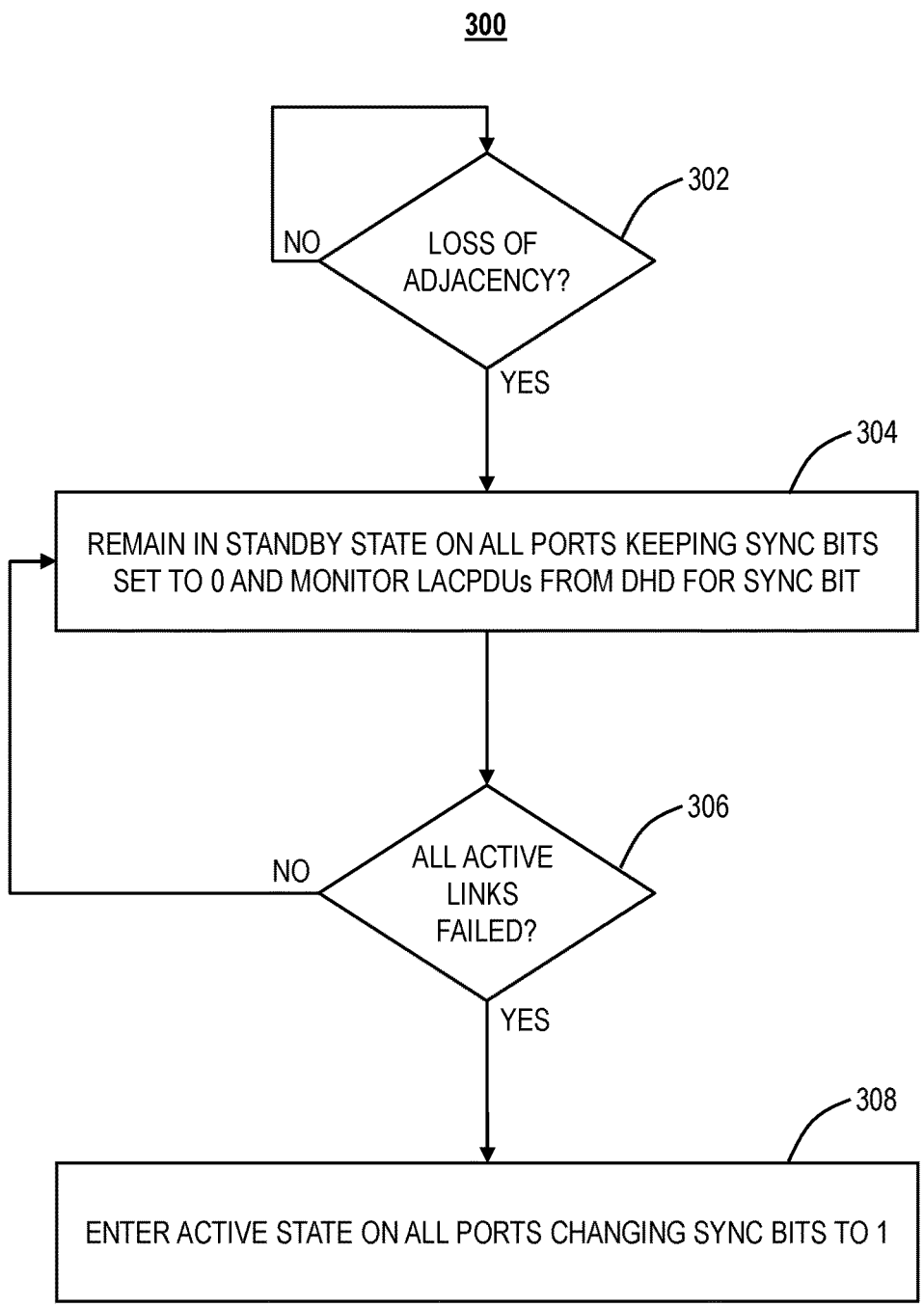
FIG. 7 illustrates a flowchart of an AON switchover process in accordance with an embodiment of the proposed solution implemented by the standby RG member node subsequent to the loss of connectivity with the active Redundant Group (RG) member node such as due to the fault on the ICCP link.

FIG. 7 is a flowchart of an AON switchover process 300 implemented by the standby RG member node 16 subsequent to the loss of connectivity with the active RG member node 14 such as due to the fault 102 on the ICCP link 28. The standby RG member node 16 performs the AON switchover process 300 to eliminate chances that the split-brain problem may cause a loop. The standby RG member node 16 begins the AON switchover process 300 subsequent to the loss of adjacency with the active RG member node 14 (step 302). Subsequent to loss of adjacency (the ICCP link 28 failure), the standby RG member node 16 remains in the standby state on all of the ports 36 keeping the SYNC bits set to 0 with the standby RG member node 16 monitoring LACP-DUs from the DHD 18 for their associated SYNC bit (step 304). Specifically, this monitoring does not require the DHD 18 to make changes, but simply assumes DHD 18 to operate standard LACP in an N:N link-level redundancy scheme.

The standby RG member node 16 can infer the operational status of the active ports 34 based on the SYNC bits from the DHD 18 on the standby ports 36. Specifically, the standby RG member node 16 knows the value of N (N:N) and can infer the number of active/failed links on the ports 34 based on the number of SYNC bit values equal to 1 coming from the DHD 18 on the ports 36. Thus, the AON switchover process 300 operates in a triangle MC-LAG with N:N active/standby configurations.

Based on the monitoring, the standby RG member node 16 can determine if any active links have failed (step 306). Specifically, no active links have failed if none of the ports 36 have the SYNC bit set to 0 coming from the DHD 18 and the standby RG member node 16 remains, (step 304), in the standby state on all of the ports 36 keeping the SYNC bits set to 0 and the standby RG member node 16 monitors LACPDUs from the DHD 18 for their associated SYNC bit (step 306).

There are active links failed if any link on the ports 36 has the SYNC bit set to 1 coming from the DHD 18 (step 306). The standby RG member node 16 determines whether all of the active links have failed or whether some, but not all of the active links have failed (step 306). The standby RG member node 16 will only become active when all of the active links (34) have failed. This prevents the loops and does not require coordination with the DHD 18 or changes to system MAC addresses.

The standby RG member node 16 can determine whether or not all of the active links have failed by determining the number of links on the ports 36 from the DHD 18 which are showing the SYNC bit as 1. That is, if all of the ports 36 are showing LACPDUs from the DHD 18 with the SYNC bit as 1, then all of the active links (34) have failed, i.e., N links on the ports 36 show SYNC=1 from the DHD 18 then the N links on the ports 34 are failed.

If not all of the active links have failed (step 306), then the standby RG member node 16 remains in the standby state on all ports keeping the SYNC bits set to 0 and continues to monitor LACPDUs from the DHD 18 (step 304). If all of the active links (34) have failed (step 308), the standby RG member node enters the active state on all ports 36 changing the SYNC bits to 1 (step 308). This will result in the backup path going to distribution state and traffic will resume after protection switching.

Again, the AON switchover process 300 is implemented on the RG 12 and therefore is interoperable with any vendor's DHD 18 supporting standard LACP and the switchover time is not compromised since no re-convergence is required. Also, the AON switchover process 300 can be configurable and selectively enabled/disabled on both of the member nodes 14, 16.

Referring back to FIGS. 5 and 6, an operation of the AON switchover process 300 is illustrated. In FIG. 5, similar to FIG. 4, at step 350-1, there is a fault 102 that causes the ICCP link 28 to fail. Again, the fault 102 could be for any reason. At step 350-2, the member nodes 14, 16 detect the ICCP link 28 failure and report the same to the MC-LAG 10. At step 350-3, the active member RG node 14 goes to standalone (active), and the SYNC bit remains at 1 on the operational links in the ports 34. Also at step 350-3, if the standby RG member node 16 is configured with the AON switchover process 300 enabled, the standby RG member node 16 goes to a standalone mode, but non-distributing, keeping the SYNC bits set at 0 for all links in the ports 36.

Now, in the standalone mode, but non-distributing, the standby RG member node 16 monitors the LACPDUs from the DHD 18 on the ports 36. At step 350-4, the DHD 18 determines the fault 104 on the ports 34 and since this is N:N redundancy, the DHD 18 selects a standby port as active on the ports 36 setting the SYNC bit to 1. Note, since the standby RG member node 16 is operating the AON switchover process 300, the standby RG member node 16 remains in the standalone mode, but non-distributing with all links in the ports 36 transmitting SYNC=0 to the DHD 18.

In FIG. 6, at step 350-5, the last link in the ports 34 fails. The active RG member node 14 goes into standalone, non-distributing and the SYNC bits are 0 on all links on the ports 34. At step 350-6, the DHD 18 selects another standby port of the ports 36 to set as active and sets the SYNC bit to 1. At step 350-7, the standby RG member node 16 determines that all of the active links (34) have failed. In this example, this is due to the DHD 18 sending SYNC=1 on two ports of the ports 36, N=2 here. At this point, (350-7) the standby RG member node 16 sets the SYNC bit to 1 on all of the ports 36 since the DHD 18 also has the SYNC bit set to 1 on all of the ports 36 and the ports 36 go into distribution, such that the traffic switches from the ports 34 to the ports 36.

Network Element

Figure 8:
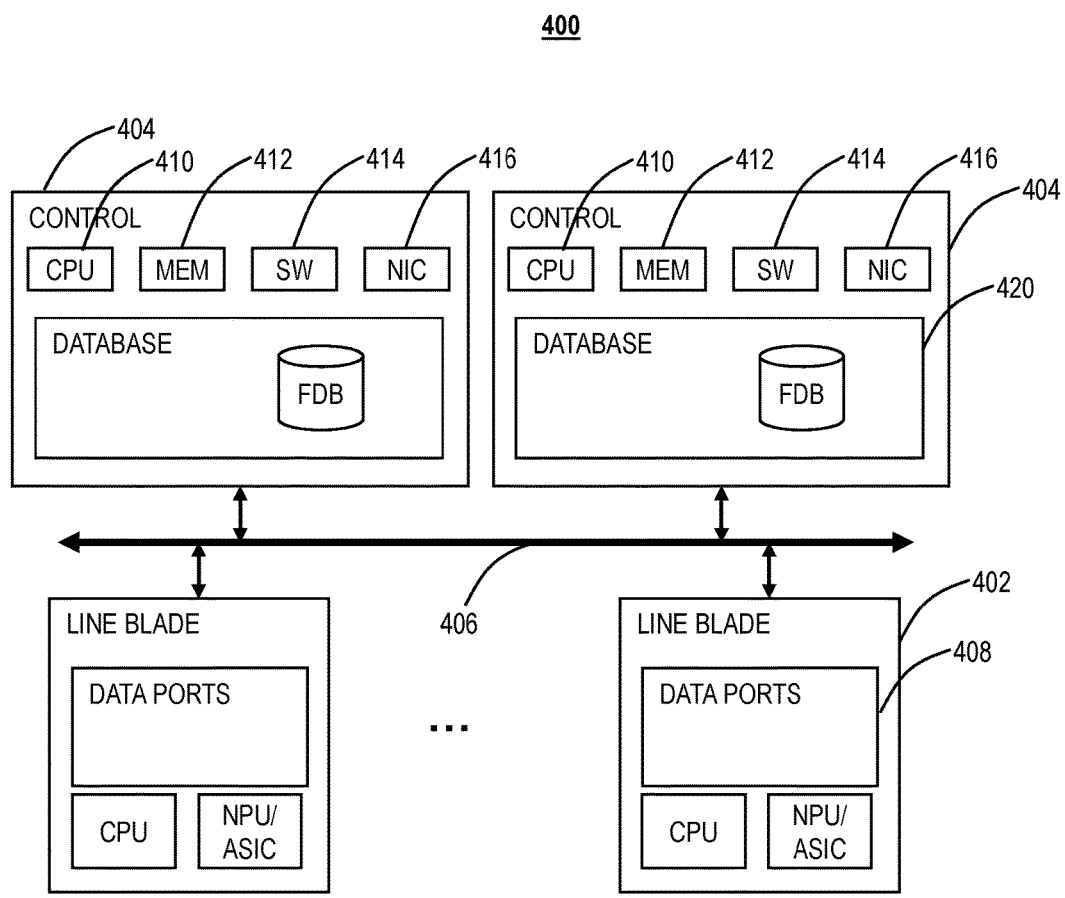
FIG. 8 illustrates an example network element for the proposed systems and methods described herein.

FIG. 8 illustrates an example network element 400 for the systems and methods described herein. In this embodiment, the network element 400 is an Ethernet, MPLS, IP, etc. network switch, but those of ordinary skill in the art will recognize the systems and methods described herein can operate with other types of network elements and other implementations. Specifically, the network element 400 can be the RG member nodes 14, 16. Also, the network element 400 can be the DHD 18 as well. In this embodiment, the network element 400 includes a plurality of blades 402, 404 interconnected via an interface 406. The blades 402, 404 are also known as line cards, line modules, circuit packs, pluggable modules, etc. and generally refer to components mounted on a chassis, shelf, etc. of a data switching device, i.e., the network element 400. Each of the blades 402, 404 can include numerous electronic devices and optical devices mounted on a circuit board along with various interconnects including interfaces to the chassis, shelf, etc. Those skilled in the art will recognize that the network element 400 is illustrated in an oversimplified manner and may include other components and functionality.

Two blades are illustrated with line blades 402 and control blades 404. The line blades 402 include data ports 408 such as a plurality of Ethernet ports. For example, the line blade 402 can include a plurality of physical ports disposed on an exterior of the blade 402 for receiving ingress/egress connections. Additionally, the line blades 402 can include switching components to form a switching fabric via the interface 406 between all of the data ports 408 allowing data traffic to be switched between the data ports 408 on the various line blades 402. The switching fabric is a combination of hardware, software, firmware, etc. that moves data coming into the network element 400 out by the correct port 408 to the next network element 400. "Switching fabric" includes switching units, or individual boxes, in a node; integrated circuits contained in the switching units; and programming that allows switching paths to be controlled. Note, the switching fabric can be distributed on the blades 402, 404, in a separate blade (not shown), or a combination thereof. The line blades 402 can include an Ethernet manager (i.e., a processor) and a Network Processor (NP)/Application Specific Integrated Circuit (ASIC).

The control blades 404 include a microprocessor 410, memory 412, software 414, and a network interface 416. Specifically, the microprocessor 410, the memory 412, and the software 414 can collectively control, configure, provision, monitor, etc. the network element 400. The network interface 416 may be utilized to communicate with an element manager, a network management system, etc. Additionally, the control blades 404 can include a database 420 that tracks and maintains provisioning, configuration, operational data and the like. In this embodiment, the network element 400 includes two control blades 404 which may operate in a redundant or protected configuration such as 1:1, 1+1, etc. In general, the control blades 404 maintain dynamic system information including packet forwarding databases, protocol state machines, and the operational status of the ports 408 within the network element 400.

When operating as the standby RG member node 16, the various components of the network element 400 can be configured to implement the AON switchover process 300.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method utilizing all-or-none switchover to prevent split-brain problems in a Multi-Chassis Link Aggregation Group (MC-LAG) network implemented by a standby node, the method comprising:
   remaining in a standby state responsive to a loss of adjacency with an active node, wherein, in the standby state, all standby links between the standby node and a common endpoint are non-distributing;
   monitoring frames transmitted by the common endpoint to the standby node over the standby links; and
   determining based on the monitoring frames whether all active links between the active node and the common endpoint have failed and entering an active state with all the standby links distributing based thereon.

2. The method of claim 1, further comprising:
   determining based on the monitoring frames whether less than all of the active links have failed and remaining in the standby state and continuing monitoring the frames transmitted by the common endpoint over the standby links based thereon.

3. The method of claim 1, wherein the monitoring checks for a presence of SYNC bits from the common endpoint with each SYNC bit set to TRUE indicative of a switch by the common endpoint of one of the active links to one of the standby links.

4. The method of claim 1, wherein the common endpoint is communicatively coupled to both the active node and the standby node in an active/standby triangle topology.

5. The method of claim 1, wherein the common endpoint is configured to operate Link Aggregation Control Protocol (LACP) and an N:N link-level redundancy between the active node and the standby node.

6. The method of claim 1, wherein the common endpoint is unaware the active node and the standby node are in separate network elements.

7. The method of claim 1, wherein the loss of adjacency with the active node is based on a failure or fault on a link between the active node and the standby node used for coordination of the active node and the standby node in a Redundant Group, while the active node and the standby node are both operational.

8. A standby node in a Multi-Chassis Link Aggregation Group (MC-LAG) network configured with all-or-none switchover to prevent split-brain problems, the standby node comprising:
   a plurality of ports in a logical Link Aggregation Group (LAG) with an active node, wherein the plurality of ports form standby links with a common endpoint;
   a communication link with an active node; and
   a switching fabric between the plurality of ports,
   wherein the standby node is configured to
      remain in a standby state responsive to a loss of the communication link, wherein, in the standby state, all the standby links are non-distributing;
      monitor frames transmitted by the common endpoint to the standby node over the standby links; and
      determine based on the monitored frames whether all active links between the active node and the common endpoint have failed and enter an active state with all the standby links distributing based thereon.

9. The standby node of claim 8, wherein the standby node is further configured to
   determine based on the monitoring frames whether less than all of the active links have failed and remain in the standby state and continue monitoring the frames transmitted by the common endpoint over the standby links based thereon.

10. The standby node of claim 8, wherein the frames are monitored to check for a presence of SYNC bits from the common endpoint with each SYNC bit set to TRUE indicative of a switch by the common endpoint of one of the active links to one of the standby links.

11. The standby node of claim 8, wherein the common endpoint is communicatively coupled to both the active node and the standby node in an active/standby triangle topology.

12. The standby node of claim 8, wherein the common endpoint is configured to operate Link Aggregation Control Protocol (LACP) and an N:N link-level redundancy between the active node and the standby node.

13. The standby node of claim 8, wherein the common endpoint is unaware the active node and the standby node are in separate network elements.

14. The standby node of claim 8, wherein the loss of adjacency with the active node is based on a failure or fault on the communication link, while the active node and the standby node are both operational.

15. An apparatus configured for all-or-none switchover to prevent split-brain problems in a Multi-Chassis Link Aggregation Group (MC-LAG) network located at a standby node, the apparatus comprising:
circuitry configured to remain in a standby state responsive to a loss of adjacency with an active node, wherein, in the standby state, all standby links between the standby node and a common endpoint are non-distributing;
circuitry configured to monitor frames transmitted by the common endpoint to the standby node over the standby links; and
circuitry configured to determine based on the monitored frames whether all active links between the active node and the common endpoint have failed and enter an active state with all the standby links distributing based thereon.

16. The apparatus of claim 15, further comprising:
circuitry configured to determine based on the monitored frames whether less than all of the active links have failed and remain in the standby state and continue monitoring the frames transmitted by the common endpoint over the standby links based thereon.

17. The apparatus of claim 15, wherein the circuitry configured to monitor checks for a presence of SYNC bits from the common endpoint with each SYNC bit set to TRUE indicative of a switch by the common endpoint of one of the active links to one of the standby links.

18. The apparatus of claim 15, wherein the common endpoint is communicatively coupled to both the active node and the standby node in an active/standby triangle topology.

19. The apparatus of claim 15, wherein the common endpoint is configured to operate Link Aggregation Control Protocol (LACP) and an N:N link-level redundancy between the active node and the standby node.

20. The apparatus of claim 15, wherein the common endpoint is unaware the active node and the standby node are in separate network elements.

* * * * *